INVENTOR.
ROBERT E. SHELLEY
BY Bosworth, Sessions,
Herrstrom + Knowles
ATTORNEYS.

Jan. 7, 1969   R. E. SHELLEY   3,420,582
UNIVERSAL FLEXURE TYPE JOINT
Filed July 22, 1964

INVENTOR.
ROBERT E. SHELLEY
BY Bosworth, Sessions,
Herrstrom & Knowles
ATTORNEYS.

Jan. 7, 1969    R. E. SHELLEY    3,420,582
UNIVERSAL FLEXURE TYPE JOINT
Filed July 22, 1964

INVENTOR.
ROBERT E. SHELLEY
BY Bosworth, Sessions,
Herstrom & Knowles
ATTORNEYS.

United States Patent Office 3,420,582
Patented Jan. 7, 1969

3,420,582
UNIVERSAL FLEXURE TYPE JOINT
Robert E. Shelley, Cumberland, Md., assignor, by mesne assignments, to Toroid Corporation, Huntsville, Ala., a corporation of Alabama
Filed July 22, 1964, Ser. No. 384,495
U.S. Cl. 308—2
Int. Cl. F16c *11/00*
9 Claims This invention relates to a universal flexure type joint and more particularly to a universal support for connecting a rocket or jet engine or other thrust load producing device to a force measuring system for precision measuring of thrust forces. An ideal support for such uses should be frictionless and have zero backlash, a high torsional, axial and shear load capacity, a constant center of rotation, low pivoting restraint, and omnidirectional flexing.

Universal supports which contain knife edges, antifriction bearings, and ball and socket joints are well known and have been used. However, friction, wear, and manufacturing tolerances inherent in such devices introduce inaccuracies in the test results. Universal supports in which the metal of the support is flexed are known but lack lateral, axial, and torsional stability, have no well defined axes about which pivoting can take place, and are difficult to manufacture.

It is therefore an object of this invention to provide a flexure type joint which avoids the disadvantages pointed out above with respect to the known supports and approaches the properties of an ideal support.

It is a further object of this invention to provide a safety means to avoid the destruction of the equipment under test in the event of failure of the flexing elements.

Figures 1, 2, 9:
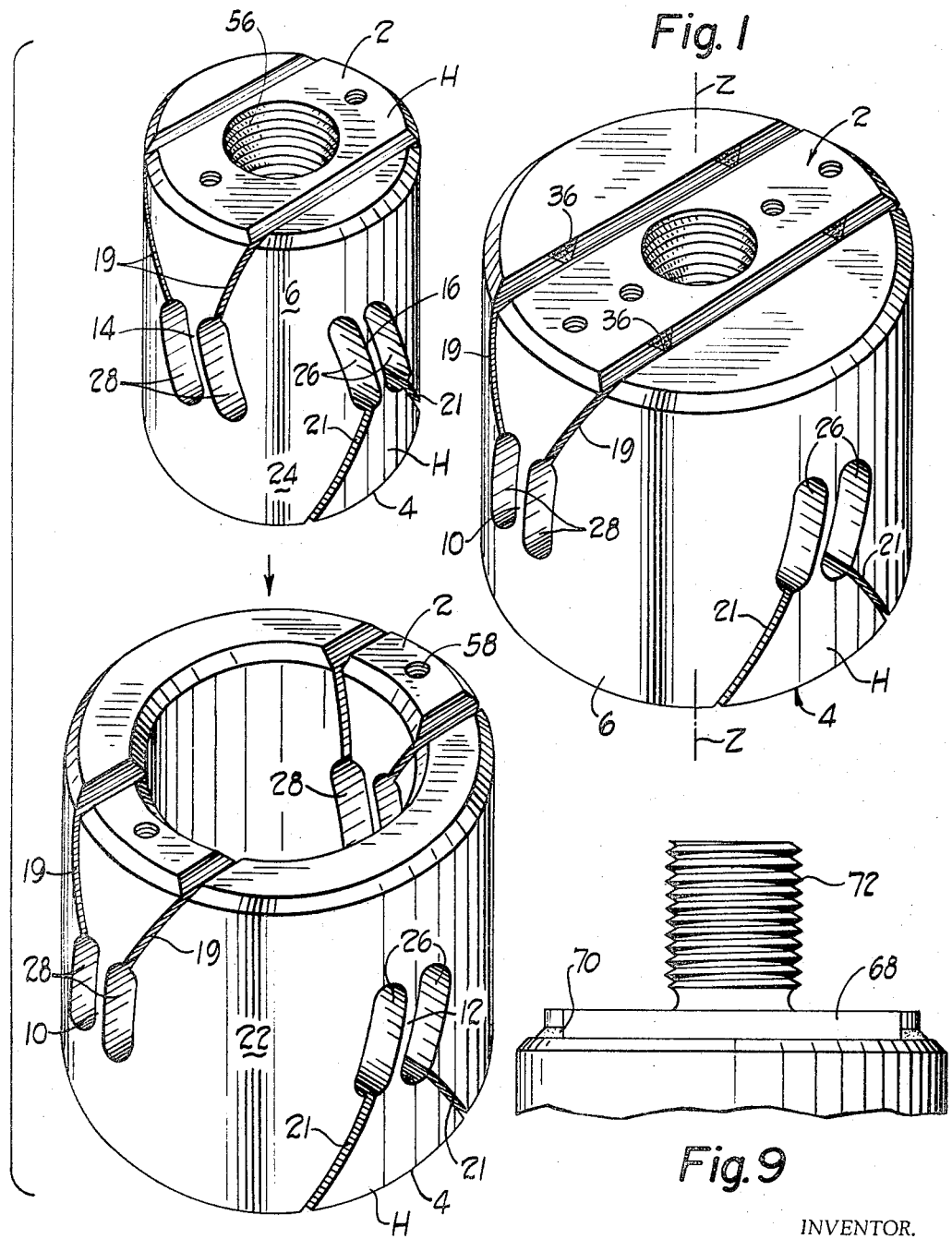
Figure 3:
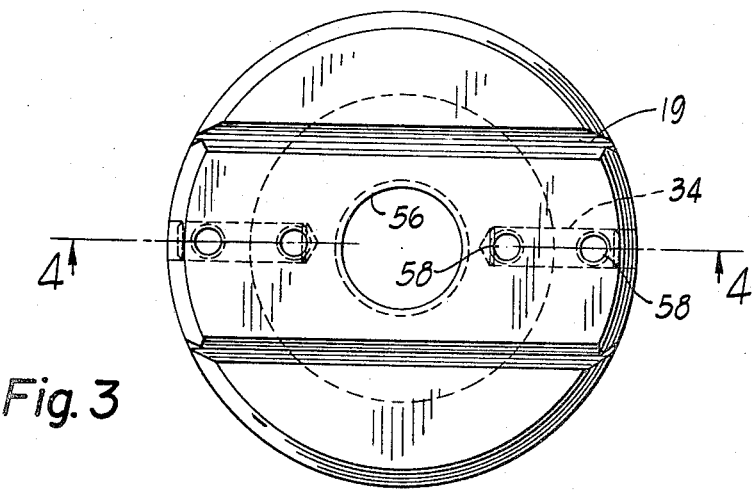
Figure 4:
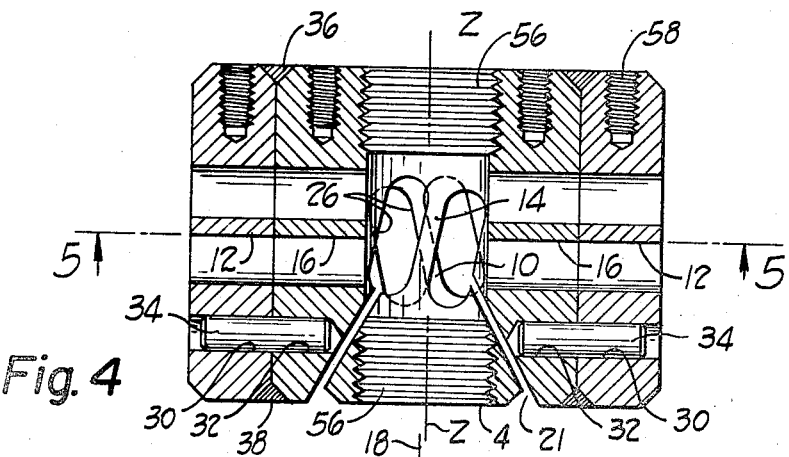
Figure 5:
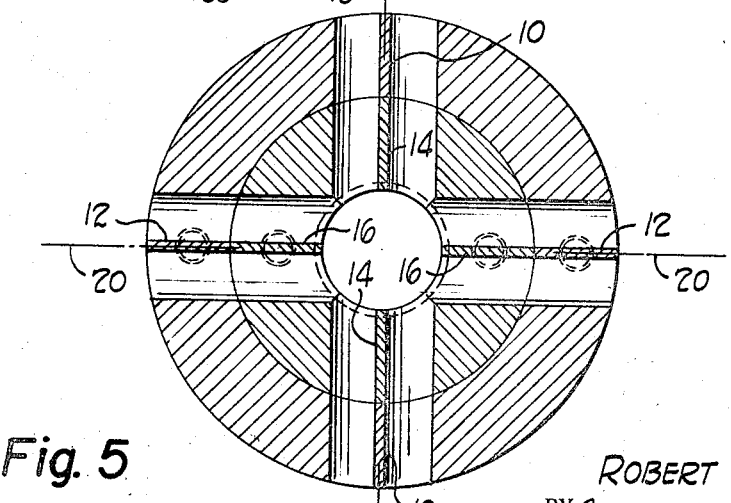
Figure 6:
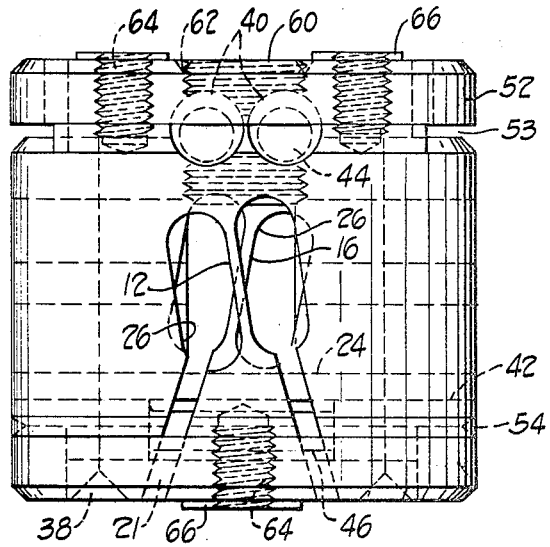
Figure 7:
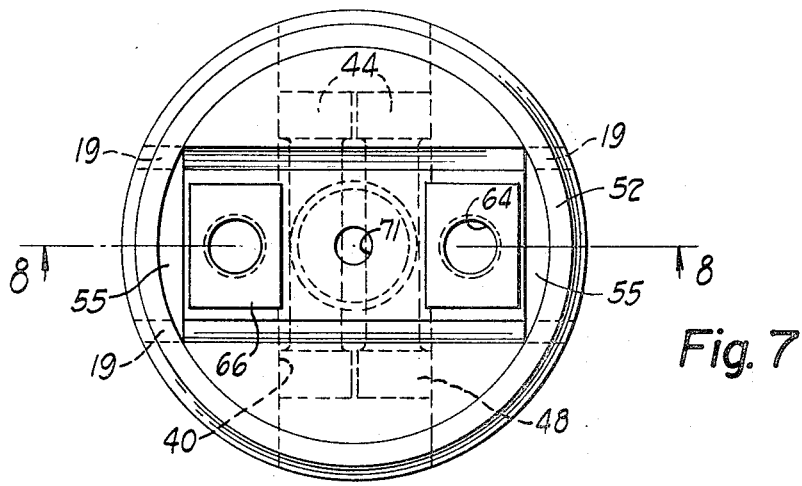
Figure 8:
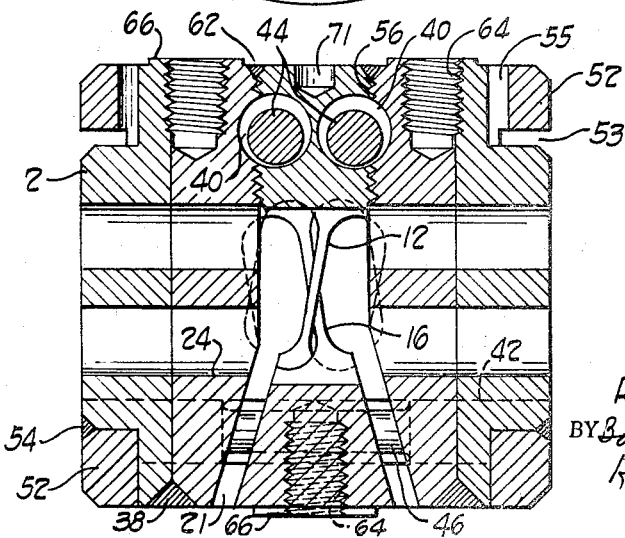

An understanding of this invention will be had by referring to the following detailed description in conjunction with the accompanying drawings wherein:

FIG. 1 is a perspective view of the flexure of this invention.
FIG. 2 is an exploded view of the flexure of FIG. 1.
FIG. 3 is a plan view of the flexure of FIG. 1.
FIG. 4 is a section taken along line 4—4 of FIG. 3.
FIG. 5 is a full section taken along the line 5—5 of FIG. 4.
FIG. 6 is an elevation of a modified form of a flexure.
FIG. 7 is a plan view of the flexure of FIG. 6.
FIG. 8 is a section taken along line 8—8 of FIG. 7.
FIG. 9 is a detail of a form of connector for mounting flexures embodying this invention.

FIG. 1 shows a flexure joint comprising two end members 2 and 4 joined to an intermediate member 6 by sets of flexible webs 10, 12, 14, 16. The webs are integral with the end members and the intermediate member and make an acute angle with the longitudinal axis Z—Z as can be seen in FIGS. 1 and 4. Each set of webs comprises a radially outer pair 10, 12 and a radially inner pair 14, 16; the outer pair making an acute angle with the longitudinal axis as if part of a helix of given hand with the inner pair making an actuate angle with the longitudinal axis as if part of a helix of opposite hand. The planes containing the webs intersect along lines 18 and 20 (see FIG. 5) perpendicular to the Z—Z axis and perpendicular to each other. Flexing of the webs about these lines provides the universal motion. Pairs of slots 19 and 21 at right angles to each other are cut in converging planes to connect the upper and lower surfaces with the openings 26 and 28. This produces end members 2 and 4 which have a T shape with the head portions H connected to the intermediate member 6 by crossed flexible webs 10, 12, 14, 16. The width of slots 19 and 21 determines the angular movement limit of ends 2 and 4.

The joint is formed from two tubes 22, 24 as shown in FIG. 2. Four pairs of openings 26 are cut at an angle to the longitudinal axis in the outer tube 22 and similar openings 28 are cut in the inner tube 24. The tubes are telescoped together with a close fit and with the mid points of adjacent webs 10, 14 and 12, 16 adjacent each other. Aligned holes 30, 32 (FIG. 5) are drilled in the outer and inner members 22, 24 and pins 34 are driven into the holes to insure that the parts remain aligned during the subsequent machining and welding operations. The telescoped elements are welded at 36, 38 to fixedly secure the tubes. Slots 19 and 21 are then cut in the assembled flexure.

The modified form of the invention shown in FIGURES 6, 7 and 8 discloses a flexure embodying this invention and having one or more (four shown) transverse safety pins. This form of the invention is made in the same manner as the preferred form of the invention just described with the additional steps and structure of securing threaded plugs 60, as by welding at 62, in central holes 56 and then drilling the assembled tubes and plug or plugs to provide holes 40, 42 (FIGS. 6 and 7) into which are fitted safety pins 44, 46 with the ends 48 of the pins closely fitted in the holes in the member 6 and with the central portions 50 of the pins being of reduced diameter in the end members 2 and 4. The difference in diameter between the holes 40, 42 and portions 50 of the safety pins allows the end members to pivot about lines 18 and 20 and in the event the flexible webs are broken by a tension load the portions 50 contact the walls of holes 40 to avoid damage to the device under test.

An additional safety device in the form of a ring 52 is also provided when large loads are to be measured. As shown in FIGS. 6, 7 and 8 the ring is spaced from the end members 2 and 4 as at 53, 55 and secured to the intermediate member 6 as by welding at 54.

Although both pins and rings are shown as used together in FIGS. 6, 7 and 8 it is to be understood that it is within the scope of the invention to use them separately or not at all such as in the case where the load to be measured is in the direction to force end members 2 and 4 toward each other.

In order to connect the flexure joint with a measuring system and a device having thrust there is illustrated several species of connecting means. In FIG. 1, for example, there are shown threaded holes 56, 58 in the end member 2 with similar holes in end member 4. Threaded fasteners, not shown, can be threaded into these holes to connect the flexure point to the system. In fact, any desirable pattern of threaded holes could be used and could be different in each end member.

FIGS. 6, 7 and 8 show a connecting means comprising pairs of threaded openings 64 with flat seats 66 surrounding said openings 64, respectively, which are ground flat with great accuracy.

FIG. 9 shows a connecting means comprising a plate 68 secured to an end member as by welding 70 and carrying a threaded plug 72.

While the invention has been described as a flexure type joint for use in transmitting thrust it is within the scope of the invention to use the joint as a flexible shaft coupling for transmitting torque between a driving shaft and a driven shaft and for transmitting thrust and tension between them.

Axial alignment between the flexure, the thrust measuring device, and the mounting plate to which it attaches is maintained by either a male stud 72 bottomed in the mating threaded hole against the plate 68, a split nut adapter (not shown) to provide clamping on the mating stud similar to 72, or the dowel pin on the mating adapter inserted in the dowel pin hole 71.

What is claimed is:

1. A universal flexure comprising an outer cylindrical shell and an inner cylindrical shell forming a coaxial cylindrical assembly, each said shell having first, second, third and fourth pairs of slots, respectively, formed in the cylindrical walls thereof, 90° apart, first, second, third and fourth webs formed by and between each said pair of slots, respectively, each said web in said inner shell being canted in one direction from the direction parallel to the axis of said cylindrical assembly, each said web in said outer shell being canted about the same amount in the opposite direction with respect to said axis of the cylindrical assembly so that when said inner and outer shells are positioned coaxially, the center lines of said first, second, third and fourth webs of said inner and outer webs are respectively aligned and are positioned in a plane normal to said axis of said cylindrical assembly, a pair of end slots extending from each end of said cylindrical assembly, each said pair of end slots being symmetrically placed with respect to said axis of said cylindrical assembly, said pairs of end slots extending at right angles to each other, one said pair of end slots intersecting said first and third pairs of web forming slots of said inner and outer shells, the other said pair of end slots intersecting said second and fourth pairs of web forming slots of said inner and outer shells, one said slot of each pair or end slots intersecting only one slot of each pair of web forming slots, respectively, in each said shell and each said pair of end slots defining an end member therebetween.

2. The flexure according to claim 1 with means to attach said end members, respectively, to supporting dynamic structure.

3. The flexure according to claim 1 with stop means limiting axial movement of said end members, respectively, in the event of failure of said webs.

4. The flexure according to claim 3 in which said cylindrical assembly has an intermediate member with portions extending outwardly of at least one said pair of end slots, respectively, and said stop means comprises at least one bore extending transversely through a said end member and the adjacent portions of said intermediate member, and a pin is disposed in each said bore, each said pin having enlarged head portions at each end having a close fit with said intermediate member and a central portion of reduced diameter having a spaced apart fit with the end member through which said pin extends.

5. The flexure according to claim 4 in which said stop means comprises at least one said bore and associated pin extending through each said end member.

6. The flexure according to claim 3 in which said cylindrical assembly has an intermediate section with portions extending outwardly of at least one said pair of end slots respectively, and said step means comprises an annular cut out portion at at least one end of said cylindrical assembly and a ring member disposed in said cut out portion and being spaced from the adjacent said end member and being secured to each adjacent portion of said intermediate member.

7. The flexure according to claim 1 with at least one pin extending transversely between said inner and outer shells to maintain said shells in alignment.

8. A university flexure comprising an outer cylindrical shell and an inner cylindrical shell forming a coaxial cylindrical assembly, each said shell having first, second, third and fourth pairs of slots, respectively, formed in the cylindrical walls thereof, 90° apart, first, second, third and fourth webs formed by and between each said pair of slots, respectively, so that when said inner and outer shells are positoned coaxially the center lines of said first, second, third and fourth webs of said inner and outer webs are respectively aligned and are positioned in a plane normal to said axis of said cylindrical assembly, opposite webs in said inner shell being canted in one direction from the direction parallel to the axis of said cylindrical assembly and the corresponding webs in said outer shell being canted about the same amount in the opposite direction, a pair of end slots extending from each end of said cylindrical assembly, each said pair of end slots being symmetrically placed with respect to said axis of said cylindrical assembly, said pairs of end slots extending at right angles to each other, one said pair of end slots intersecting said first and third pairs of web forming slots of said inner and outer shells, the other said pair of end slots intersecting said second and fourth pairs of web forming slots of said inner and outer shells, one said slot of each pair or end slots intersecting only one slot of each pair of web forming slots, respectively, in each said shell and each said pair of end slots defining an end member therebetween.

9. The flexure according to claim 8 with at least one pin extending transversely between said inner and outer shells to maintain said shells in alignment.

References Cited

UNITED STATES PATENTS

| | | | |
|---|---|---|---|
| 2,757,056 | 7/1956 | Weber | 308—2 |
| 2,803,134 | 8/1957 | Ward | 73—141 |
| 2,819,892 | 1/1958 | Huff | 308—2 X |
| 2,931,092 | 4/1960 | Humphrey | 308—2 X |
| 2,960,302 | 11/1960 | Brown | 308—2 X |
| 2,966,049 | 12/1960 | Ormond | 308—2 X |
| 3,009,360 | 11/1961 | Morsewich | 74—5 |
| 3,073,584 | 1/1963 | Troeger | 308—2 |
| 3,092,424 | 6/1963 | Tiplitz | 267—1 |
| 3,136,157 | 6/1964 | Seed | 73—141 |
| 3,138,953 | 6/1964 | Ormond | 73—116 |
| 3,203,739 | 8/1965 | Young | 308—2 |

MARTIN P. SCHWADRON, *Primary Examiner.*

LUCIOUS L. JOHNSON, *Assistant Examiner.*

U.S. Cl. X.R.

267—1; 287—85

UNITED STATES PATENT OFFICE
CERTIFICATE OF CORRECTION

Patent No. 3,420,582                                    January 7, 1969

Robert E. Shelley

It is certified that error appears in the above identified patent and that said Letters Patent are hereby corrected as shown below:

Column 4, line 41, "2,757,056" should read -- 2,757,050 --.

Signed and sealed this 11th day of August 1970.

(SEAL)
Attest:

Edward M. Fletcher, Jr.
Attesting Officer

WILLIAM E. SCHUYLER, JR.
Commissioner of Patents